United States Patent [19]

Ko

[11] 4,292,375

[45] Sep. 29, 1981

[54] SUPERPLASTICALLY FORMED DIFFUSION BONDED METALLIC STRUCTURE

[75] Inventor: William L. Ko, Lancaster, Calif.

[73] Assignee: The United States of America as represented by the Administrator of the National Aeronautics and Space Administration, Washington, D.C.

[21] Appl. No.: 43,944

[22] Filed: May 30, 1979

[51] Int. Cl.³ .................... B32B 3/12; B64C 1/00; B64C 3/20

[52] U.S. Cl. .................... 428/593; 228/157; 244/119; 244/123; 428/604; 428/594

[58] Field of Search ............ 428/593, 594, 604; 244/119, 120, 123, 124; 52/578, 792; 228/157

[56] References Cited

U.S. PATENT DOCUMENTS

| | | | |
|---|---|---|---|
| 2,391,997 | 1/1946 | Noble | 244/119 X |
| 3,011,602 | 12/1961 | Ensurd et al. | 244/123 X |
| 3,067,494 | 12/1962 | Spain et al. | 428/594 |
| 3,071,216 | 1/1963 | Jones et al. | 428/593 |
| 3,151,712 | 10/1964 | Jackson | 244/119 X |
| 3,507,634 | 4/1970 | O'Driscoll | 244/123 X |
| 3,869,778 | 3/1975 | Yancey | 428/594 X |
| 3,884,646 | 5/1975 | Kennet | 428/593 |
| 3,924,793 | 12/1975 | Summers et al. | 228/157 |
| 3,927,817 | 12/1975 | Hamilton et al. | 228/157 |
| 4,084,029 | 4/1978 | Johnson et al. | 244/123 X |

Primary Examiner—Richard E. Schafer
Attorney, Agent, or Firm—Monte F. Mott; John R. Manning; Paul F. McCaul

[57] ABSTRACT

A structure particularly suited for use in aerospace industries comprising a base plate, a cover plate, and an orthogonally corrugated core including a pair of core plates formed of a superplastic alloy interposed between the base plate and the cover plate, in sandwiched relation therewith and bonded thereto, each of the core plates being characterized by a plurality of protrusions comprising square-based, truncated pyramids uniformly aligned along orthogonally related axes perpendicularly bisecting the legs of the bases of the pyramids and alternately inverted along orthogonally related planes diagonally bisecting the pyramids, whereby an orthogonally corrugated core is provided.

5 Claims, 7 Drawing Figures

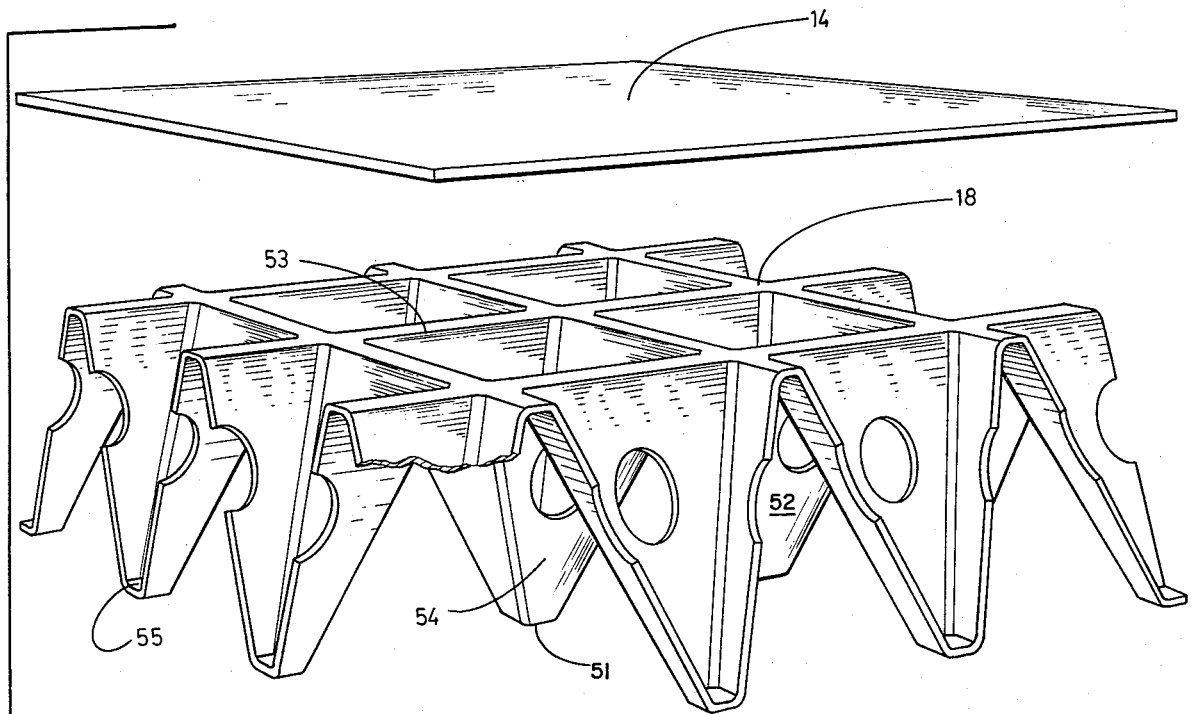
FIG. 7
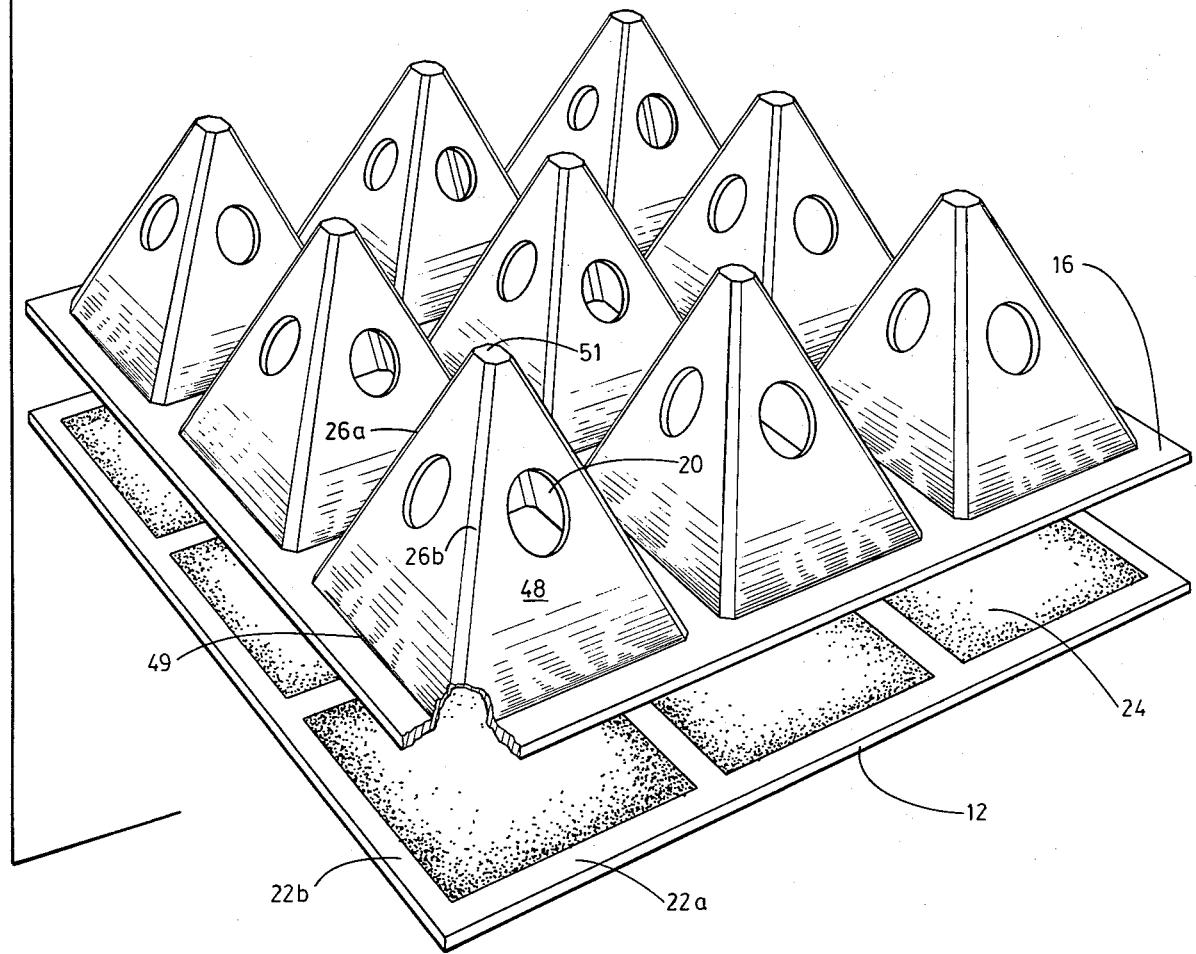

SUPERPLASTICALLY FORMED DIFFUSION BONDED METALLIC STRUCTURE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention generally relates to sandwich structures and more particularly to superplastically formed, diffusion bonded, orthogonally corrugated core sandwich panels.

Ever since the first successful application of the sandwich structures in the British all-wood "Mosquito" aircraft during World War II, sandwich structures have attained widespread usage, particularly in the aerospace industry, in the wings, wall panels, webs of beams, empennage structures and the like.

The common sandwich structure usually consists of two relatively thin, high strength face sheets separated by and bonded to a relatively thick, low density, low strength core. This type of composite structure generally is characterized by low-mass as well as high flexural stiffness characteristics.

The most extensively used sandwich structure found in the aerospace technology is the so-called honeycomb core sandwich. Usually, this structure includes a core of aluminum or titanium conforming to a honeycomb cell generatrix disposed between rigid face sheets. In such structures, the honeycomb cell generatrix is arranged perpendicularly to the face sheets and, therefore, the bonding between the honeycomb core and the face sheets can only be achieved by line-contact. As is well known, honeycomb structures sometimes fail to meet existing needs because the line-contact bonding, established between the honeycomb cell cross section and the face sheets, can and frequently does lose bonding integrity, due in part to the effects of corrosion or the like.

In recent years, a revolutionary new process known generally as superplastic forming with concurrent diffusion bonding has emerged in the fabrication of sandwich structures. This process utilizes two inherent phenomena which tend to occur concurrently in titanium alloys. The first phenomenon is the ability of a material, such as a titanium alloy, to undergo large, up to 1000% strain, plastic deformations at high temperatures without localized thinning, or necking. This phenomenon often is referred to as superplasticity. The second phenomenon relates to the capability of being joined under pressures at elevated temperatures, without melting or the use of bonding agents, herein referred to simply as diffusion bonding.

By employing the above-mentioned phenomena, sandwich structures frequently are fabricated by a diffusion-bonding of at least three superplastic alloy sheets, at selected areas, and then superplastically expanding or separating the face sheets by internal pressurization. Pressurization is achieved through a use of inert gases, such as argon, introduced into the core cavity in order to impart a final configuration to the structure. This known process tends to eliminate the use of bonding agents and facilitates surface-contact bonding, instead of line-contact bonding as occurs in the formation of the aforementioned honeycomb sandwich structures.

Through the new technique, aforedescribed, it now has become possible to provide a relatively large number of new shapes and symmetries for sandwich cores. These new shapes and symmetries include the so-called truss cores, dimpled cores, sine-wave cores, egg-box-shaped cores, truncated cores, hollow truncated square hexogonal pyramids arrayed in square or hexagonal patterns. The truss core has a relatively high flexural stiffness in the direction of the corrugation but tend to be characterized by a very low flexural stiffness in directions transverse to the axes of corrugation. Other types of the cores aforementioned also tend to be characterized by weak bending stiffness. For example, dimpled core structures tend to exhibit very low out-of-plane bending stiffness in any in-plane direction.

Typifying the methods and structures of the prior art are those disclosed in U.S. Pat. Nos. 2,766,514; 3,369,288; 3,924,793; 3,927,037; and 4,087,037. It is believed that U.S. Pat. No. 3,927,037 probably contains teachings more pertinent to the instant invention than the teachings of the remaining listed patents, since this patent discloses the use of four panel members interconnected for forming a metallic sandwich structure. However, it is believed to be apparent that the structure therein disclosed lacks the structural strength characteristics which tend to characterize the sandwich structure hereinafter more fully described.

It should now be apparent that there persists a need for an expanded metallic cellular structure which tends to overcome the aforementioned difficulties and disadvantages, without impairing the utility thereof.

It is therefore the purpose of the instant invention to provide an improved core structure having enhanced bending stiffness, in any in-plane direction, and one which can readily and economically be fabricated utilizing the known characteristics of superplastic alloys.

OBJECTS AND SUMMARY OF THE INVENTION

It is an object of the present invention to provide an improved metallic sandwich structure.

It is another object to provide a method for forming an expanded metallic structure from superplastic alloy component sheets.

It is another object to provide an economic, superplastically formed, diffusion bonded sandwich core structure characterized by optimum bending and sheer stiffness and particularly suited for aerospace applications.

Another object is to provide a superplastically formed, diffusion bonded sandwich structure, and a method for forming the same, which is particularly useful in aerospace industries, although not necessarily restricted in use thereof since the structure and method of forming the structure may be equally useful in industries having no direct relation with aerospace.

These and other objects and advantages are achieved through the use of an orthogonally corrugated core structure characterized by a base plate, a cover plate, and an expanded core comprising a pair of core plates formed of superplastic titanium alloy interposed between the base plate and the cover plates in sandwiched relation therewith and diffusion bonded thereto; each of the core plates is, in turn, characterized by a plurality of protrusions comprising hollow, square, truncated pyramids uniformly spaced along an orthogonally related axis perpendicularly bisecting parallel legs of the bases of the pyramids, and alternately inverted along orthogonally related planes diagonally bisecting the pyramids, and a method for forming the same, as will become more readily apparent by reference to the following description and claims in light of the accompanying drawings.

BRIEF DESCRIPTION OF THE DRAWINGS

FIG. 7 is an exploded view of the structure shown in FIG. 1.

DESCRIPTION OF THE PREFERRED EMBODIMENT

Figure 1:
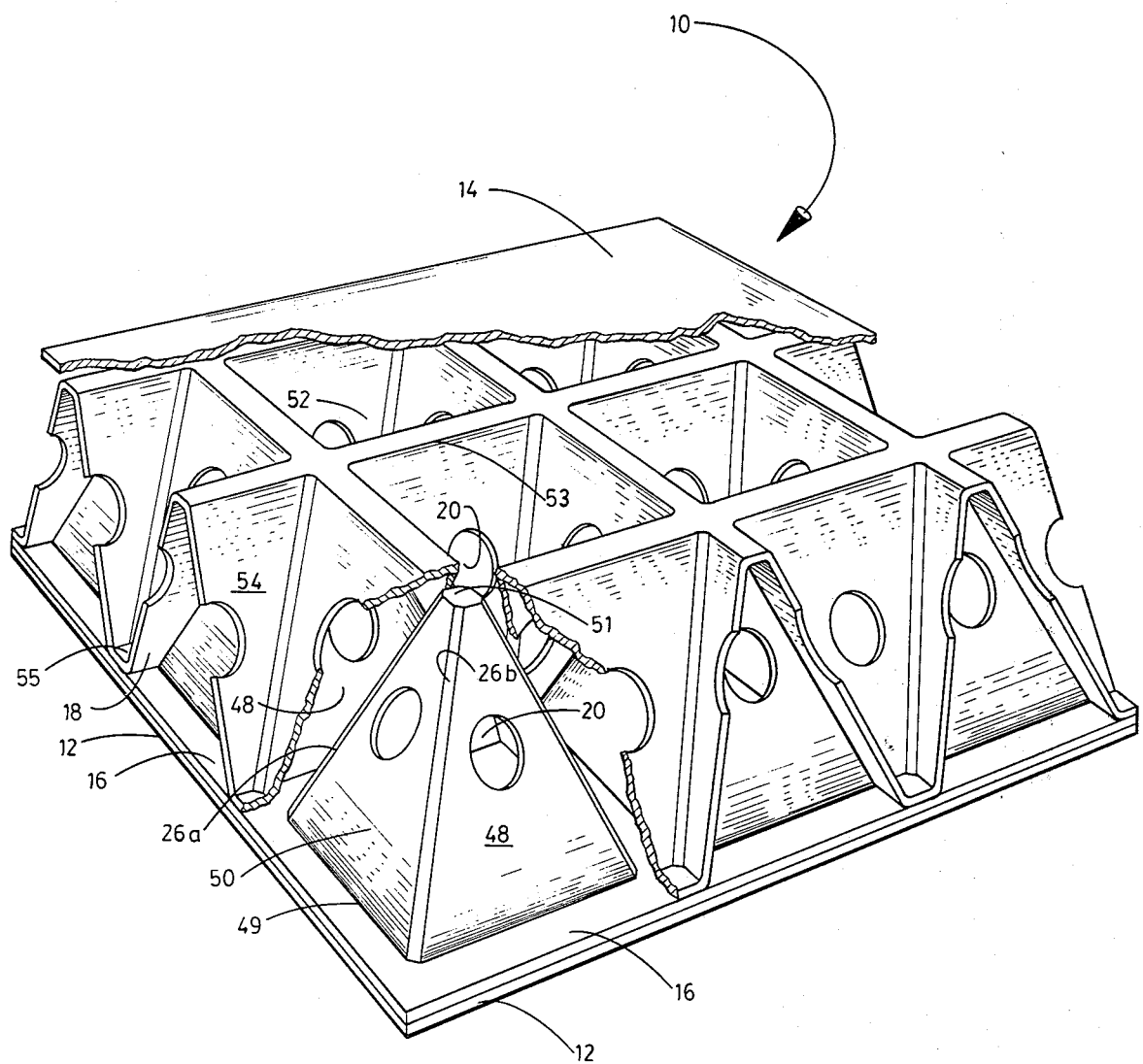
FIG. 1 is a fragmented, partially sectioned perspective view of a sandwich structure which embodies the principles of the instant invention.

Referring now to the drawings, with more particularity, wherein like reference characters designate like or corresponding parts throughout the several views, there is shown in FIG. 1 a superplastically formed, diffusion bonded structure generally designated 10, which embodies the principles of the instant invention.

It is noted that the structure 10 comprises an orthogonally corrugated sandwich core structure consisting of two families of unidirectional corrugations mutually intersecting in the same plane at 90°. As shown, the structure 10 includes a base plate 12 of a planar configuration, a cover plate 14, also of a planar configuration, and a pair of expanded core plates 16 and 18 interposed between the base plate 12 and the cover plate 14, as best illustrated in FIG. 7.

The plates 12 through 18 are of a titanium alloy having a capability of undergoing large plastic deformation, up to 1000% strain, at high temperatures, 1700° F., for example, without localized thinning or necking. Furthermore, the alloy here employed has a capability of being diffusion bonded at the elevated temperatures at which deformation occurs without melting or requiring the use of bonding agents.

Figure 2:
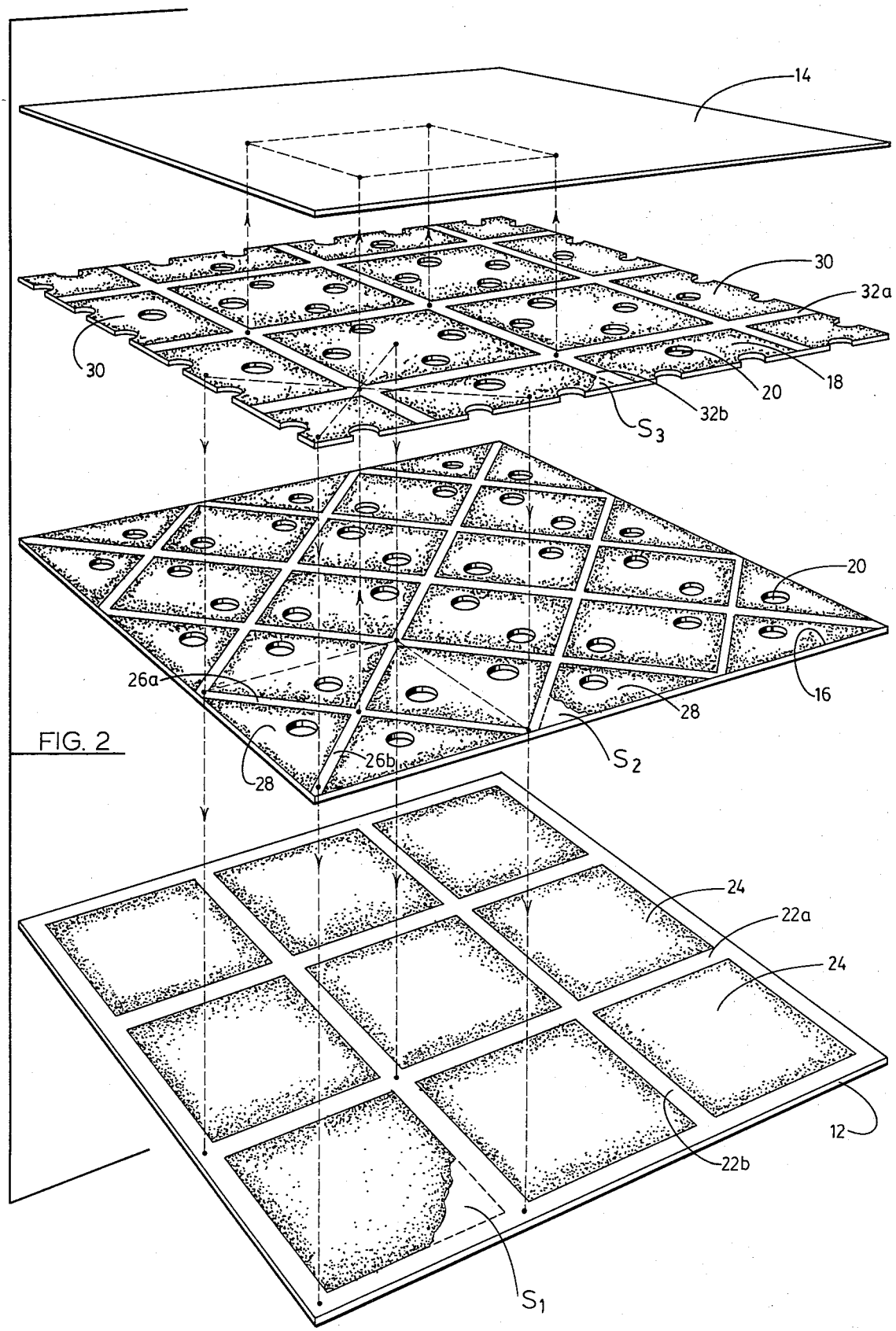
FIG. 2 is an exploded, diagrammatic view of sheets employed in fabricating the structure shown in FIG. 1.

As depicted in FIG. 2, during the initial steps of forming the structure 10, the plates 16 and 18 are provided with apertures 20, the purpose of which is to permit a flow of gas therethrough, for purposes and in a manner which hereinafter will become more fully understood.

It also is important to note that the plate 12 is provided with a plurality of linear bonding surfaces, designated 22a and 22b. The bonding surfaces, in practice, are defined by so-called stop-offs 24 which, as a practical matter, comprise square areas, designated $S_1$, coated with known compounds having a capability of preventing diffusion bonding. In practice, the compound comprises a commercially available surfacing material which is incompatible with diffusion bonding processes and is adapted to be applied by a silk screening process.

With continued reference to FIG. 2, it can be seen that the plate 16 also includes a plurality of orthogonally related linear bonding surfaces, designated 26a and 26b. It is important here to note that the linear bonding surfaces 26a extend in mutual parallelism and are normally related to a plurality of mutually parallel bonding surfaces 26b. The bonding surfaces 26a and 26b form a second uniform grid, diagonally related to the first grid, also defined by stop-offs designated 28 forming square areas $S_2$. These stop-offs are formed of a material similar to that from which the stop-offs 24 are formed. As can be seen, the bonding surfaces 26a and 26b intersect above the centers of the spacings $S_1$.

The core plate 18 also includes a plurality of normally related linear bonding surfaces, designated 32a and 32b, which define a third grid extended across the face of the plate 18, including areas $S_3$ defined by a plurality of stop-offs 30, similar to the stop-offs 24 and 28.

As indicated in FIG. 2, the linear bonding surfaces 26a and 26b are diagonally related to the areas $S_3$, as well as to the areas $S_1$. Moreover, the core plates 16 and 18 are so related, positionally, that the intersections of the linear bonding surfaces 26a and 26b coincide with the intersections of the linear bonding surfaces 32a and 32b. However, it is important to note that the grid defined by the linear bonding surfaces 32a and 32b are shifted laterally with respect to the grid defined by the linear bonding surfaces 22a and 22b.

Figure 3:
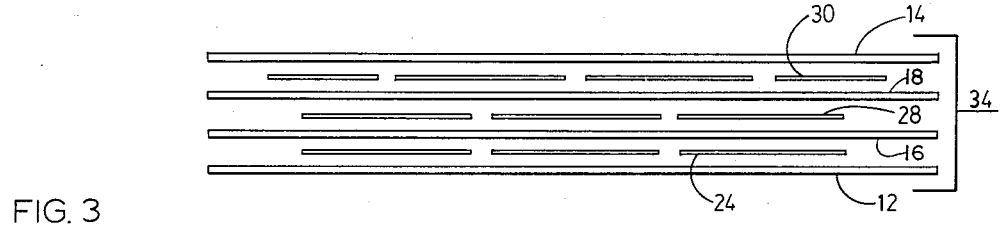
FIGS. 3 through 6 comprise views depicting a sequence of steps included in a method provided for forming the structure shown in FIG. 1.
Figure 4:
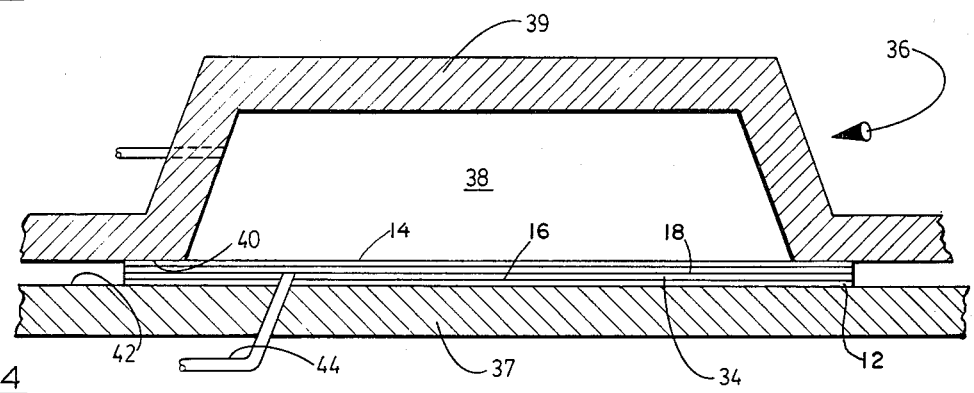

With the plates positionally oriented, as indicated in FIGS. 2 and 3, they are stacked to form a pack 34, as schematically illustrated in FIG. 3. The pack 34 is then inserted into a die, generally designated 36, FIG. 4, including a base plate 37 above which is positioned a die cavity 38 defined by a cap 39 for the die.

Figure 5:
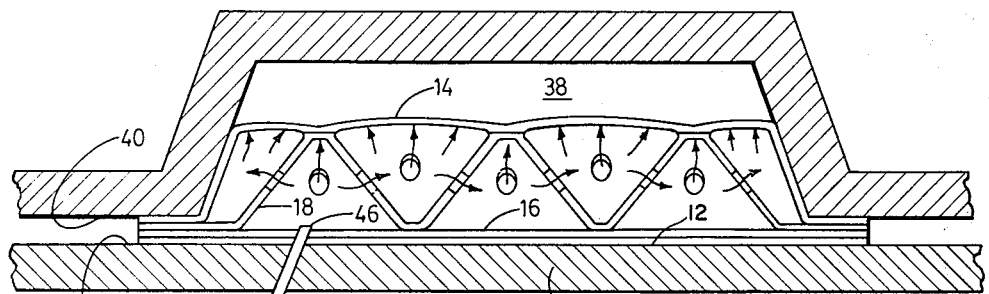

The plate 37 and cap 39 are provided with opposed clamping surfaces, designated 40 and 42, FIG. 5, the purposes of which are to engage and clamp the periphery of the pack 34 beneath the cavity 38. It will here be appreciated that the surfaces 40 and 42 effectively serve to prevent motion of the pack 34 relative to the die 36 and, further, to prevent mutual relative displacement of the plates 12 through 18.

It also is noted that extended through the base plate 37 of the die 36 there is a gas jet, designated 44. The jet 44 is, in practice, connected with a source of pressurized inert gas, not shown, such as argon or the like, and includes a tip 46 projected through a suitable formed aperture, not designated, formed in the base plate 37 and through an aperture 20 formed in the core plate 16. The die 36 is now heated to a temperature at which the plates become superplasticized and diffusion-bonding occurs between the exposed surfaces of the plates, including all those surfaces not covered by stop-offs. Where the plates are formed of a titanium alloy, a temperature of 1700° is deemed to be adequate. Thus, as indicated by the dashed lines and the arrows appearing in FIG. 2 of the drawings, the top surface of the plate 12 is bonded to the bottom surface of the plate 16 along linear surfaces coincident with the surfaces 22a and 22b; the top of the plate 16 is bonded to the bottom of the plate 18 along linear surfaces coincident with surfaces 26a and 26b; and the top of the plate 18 is bonded to the bottom of plate 14 along surfaces coincident with the surfaces 32a and 32b.

Figure 6:
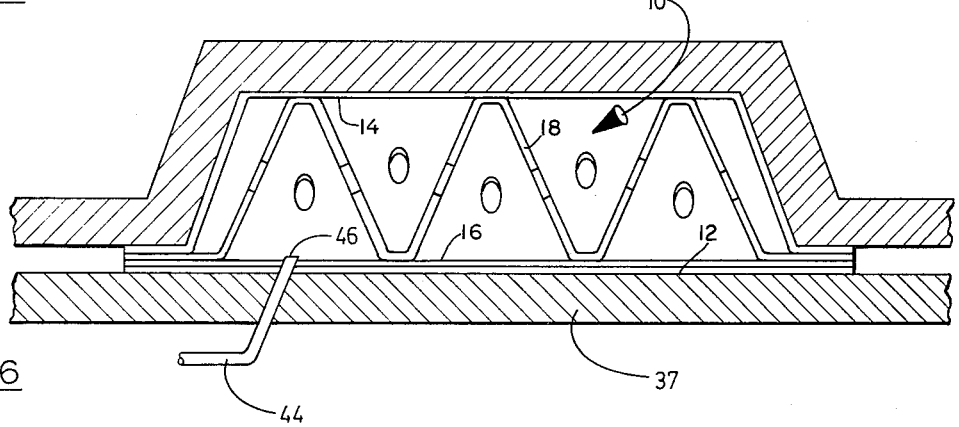

The inert gas is now injected through the jet 44 at a pressure of approximately 100 psi. As a consequence of heat and pressure, the cover plate 14 is lifted into the cavity 38 drawing with it the core plates 16 and 18, FIG. 5, now bonded together and bonded to the cover plate 14, as well as to the base plate 12. Continued application of heat and gas under pressure results in the cavity 38 being filled as indicated in FIG. 6, by the resulting structure 10.

The resulting structure 10, in effect, comprises a base plate 12 of a planar configuration, a first core plate 16 bonded to the base plate 12, having interrupted corrugations extended in parallelism, a second core plate 18 bonded to the core plate 16 and the cover plate 14, having interrupted corrugations extended orthogonally with respect to the corrugations of the plate 16.

The resulting structure comprises a core plate 16 having defined therein a uniform array of mutually spaced, truncated pyramids 48, FIG. 7, aligned along orthogonally related axes perpendicularly related to the legs of the bases of the pyramids. It is here noted that each of the pyramids 48 includes a square base 49, defined by legs, not designated, flats 50, FIG. 1, defining inclined sides, and a truncated top surface, defining an apex flat 51. The bonding surfaces 26a and 26b serve to unite the plate 16 with the plate 18. The second core plate 18 includes an array of truncated pyramids 52 inverted with respect to the pyramids 48, FIG. 7. Each of the pyramids 52 also includes a square base, designated 53, defined by legs, not designated, having inclined flats 54 defining sides, and a truncated surface defining an apex flat 51. The resulting pyramids 48 and 52 are arranged in alternate contiguous relation along orthogonally related axes engaging the pyramids 48 along the linear bonding surfaces 26a and 26b and are united to form an integrated rigid core considered to be an orthogonally corrugated core, albeit interrupted, for the resulting sandwich panel structure.

In view of the foregoing, it should now be apparent that the structure 10 comprises a lightweight, economic, bonded metallic structure capable of exhibiting optimum bending stiffness in any in-plane direction.

What is claimed is:

1. A diffusion bonded metallic sandwich structure characterized by an orthogonally corrugated core comprising:

A. a base plate of a planar configuration;
   B. a first core member comprising a first core plate seated on said base plate and consisting of a first uniform array of mutually spaced protuberances, each protuberance being of a truncated pyramidical configuration and protruding away from said base plate;
   C. a second core member comprising a second core plate seated on said first core member and consisting of a second uniform array of mutually spaced protuberances, each protuberance of said second uniform array being of truncated pyramidical configuration and protruding toward said base plate in a manner such that the protuberances of said first array are uniformly interspersed with the protuberances of the second array;
   D. a cover plate seated on said second core member; and
   E. means comprising diffusion welds bonding said plates into an integrated structure.

2. A structure as defined in claim 1 wherein the protuberances of the first array are contiguously related to the protuberances of the second array in orthogonal planes extended in diagonal bisecting relation with the protuberances.

3. A structure as defined in claim 1 wherein each of the protuberances consists of four converging planar wall surfaces intersecting a planar surface defining linear bonding surfaces and terminating at an apex flat lying in a plane paralleling the plane of the base plate.

4. A structure as defined in claim 3 wherein the linear bonding surfaces defined by the wall surfaces of the protuberances of the first array are bonded in face-to-face engagement with the apex flats of the protuberances of the second array.

5. A structure as defined in claim 4 wherein the bases of the protuberances of each array define squares uniformly spaced at a distance substantially equal to the dimension of the apex flats of the protuberances of the other array.

* * * * *